Jan. 24, 1933. A. T. SMITH 1,895,212
HEAT INSULATED COOKING VESSEL
Filed Sept. 17, 1931  2 Sheets-Sheet 1
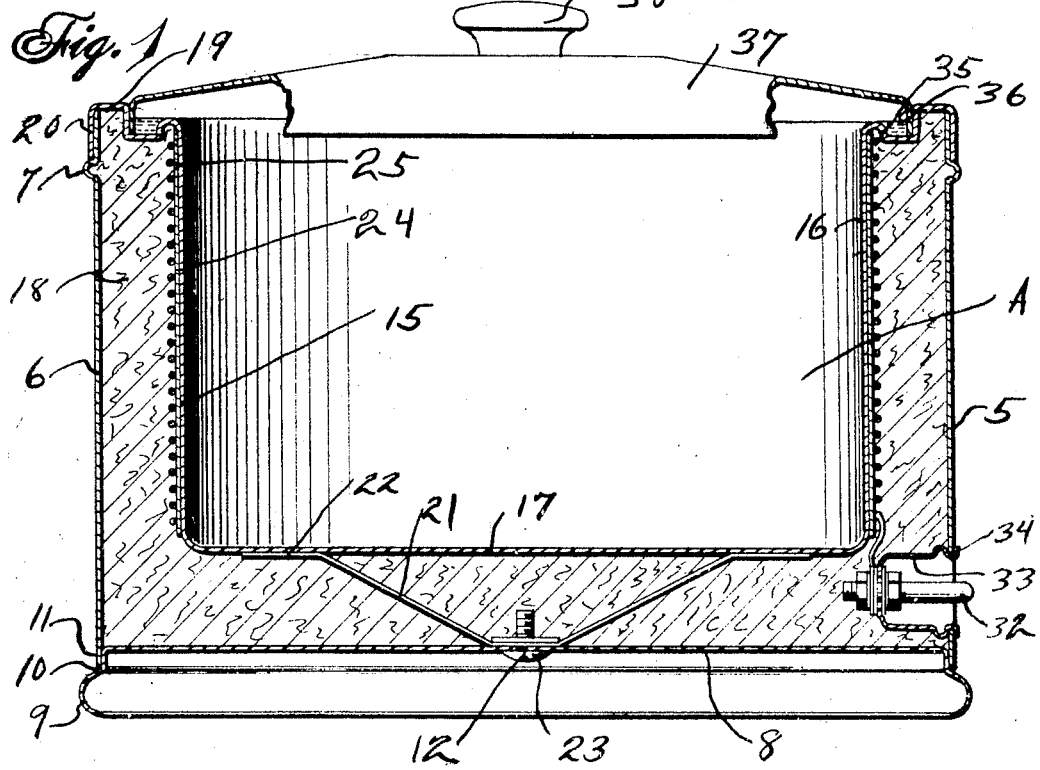
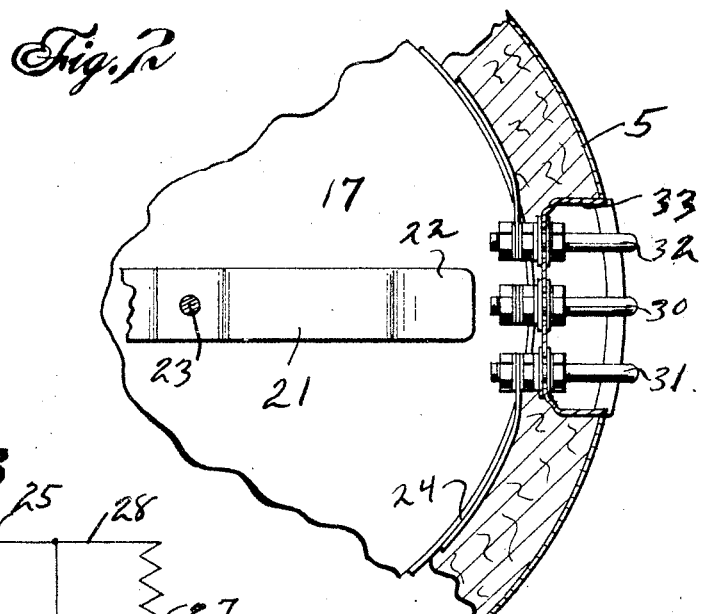
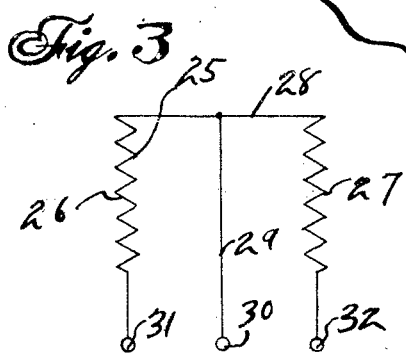
Inventor
Alva T. Smith
By [signature]
Attorneys Jan. 24, 1933. A. T. SMITH 1,895,212
HEAT INSULATED COOKING VESSEL
Filed Sept. 17, 1931 2 Sheets-Sheet 2

Inventor
Alva T. Smith
By [signature]
Attorneys

Patented Jan. 24, 1933

1,895,212

UNITED STATES PATENT OFFICE

ALVA T. SMITH, OF MILWAUKEE, WISCONSIN, ASSIGNOR TO NATIONAL ENAMELING & STAMPING COMPANY, OF MILWAUKEE, WISCONSIN

HEAT INSULATED COOKING VESSEL

Application filed September 17, 1931. Serial No. 563,329.

This invention appertains to the art of cooking and more particularly to heat insulated cooking vessels of the type embodying an electric heating coil.

One of the primary objects of this invention is to provide an electric cooking vessel of extremely light weight, and which can be handled and cleaned similar to kitchen cooking vessels and which is particularly adapted for use as a bean pot, but which is susceptible for other cooking purposes, which will readily suggest themselves to a housewife.

Another salient object of my invention is the provision of an electric cooking vessel constructed from enameled metal and embodying fitted structural units, with novel means for holding the units or parts in assembled position by the use of a single fastening element, which also acts as means for drawing the parts in tight intimate relation.

A further important object of my invention is the provision of an electric heat insulated cooking vessel embodying an outer shell including a cylindrical casing wall having a bead forming a shoulder at its upper end, a removable bottom wall flanged for receiving the lower edge of the casing wall, with a cooking pot received in the shell having a spacing and seating flange engaging the shoulder, and a single screw connecting the pot and the bottom wall together for drawing the parts and holding the same in assembled position, the space between the cooking pot and the shell being filled with heat insulating material.

A further object of my invention is the provision of a novel means for incorporating the electric heating element with the device, said heating element being arranged in close position with the cooking pot whereby the maximum amount of efficiency will be obtained therefrom, the heating element being of a novel character, whereby a high or low heat can be readily obtained.

A still further object of my invention is the provision of an electric heat insulated cooking vessel of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings.

Figure 1 is a diametric section through the improved cooking vessel;

Figure 2 is a fragmentary sectional view, taken on a horizontal plane through the shell of the vessel, looking toward the bottom of the cooking pot;

Figure 3 is a diagrammatic view showing a schematic layout of the wiring for the cooking vessel.

Figure 4:
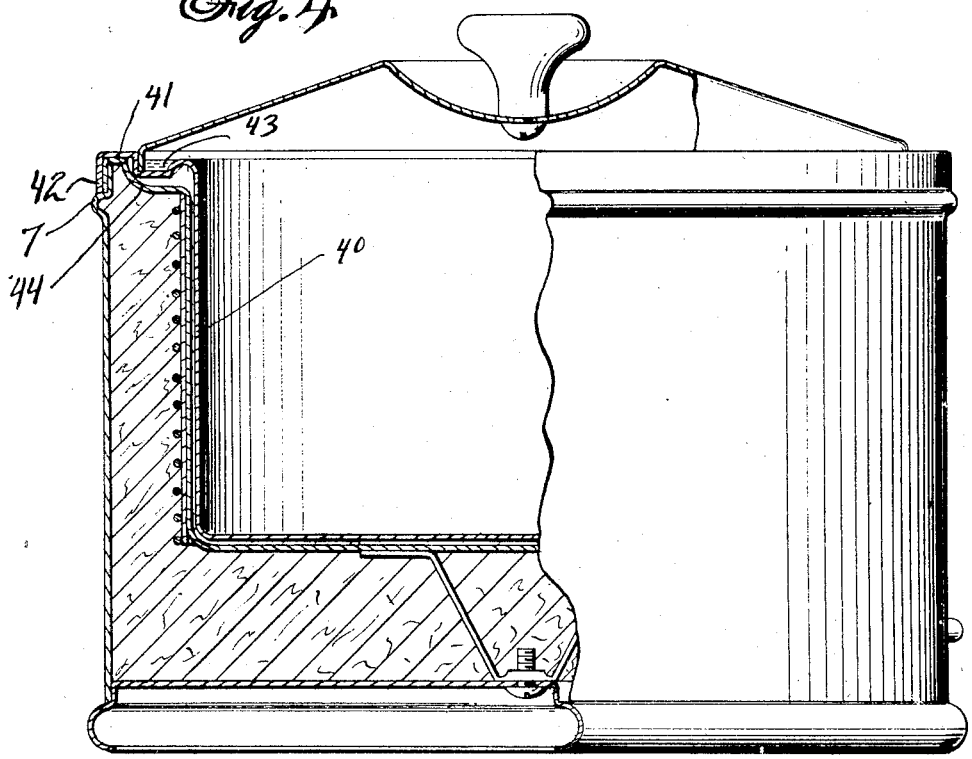
Figure 4 is a side elevation of a slightly modified form of the invention, parts of the view being shown broken away and in section to illustrate structural features.

Referring to the drawings in detail, wherein similar reference characters designate corresponding parts throughout the several views, the letter "A" generally indicates the improved vessel which embodies an outer shell 5 and an inner cooking pot 15.

The shell 5 is preferably formed from enameled metal ware of a high grade and embodies a cylindrical casing wall 6 having a struck out bead 7 formed thereon adjacent to its upper end, defining an annular shoulder. The shell also includes a bottom wall 8 having an annular depending flange 9. This flange 9 is offset intermediate its ends, defining a seating shoulder 10 and a vertical abutment wall 11. As clearly shown, in Figure 1 of the drawings, the casing wall 6 is seated on the shoulder 10 in intimate contact with the abutment wall 11. The bottom wall 8 and its axial center is provided with an opening 12, for a purpose, which will be hereinafter more fully described.

The cooking pot 15 is received within the shell 5 and is also preferably formed from enameled metal ware and includes the annular side wall 16 and the integral bottom wall 17. The side wall 16 and the bottom wall 17 are spaced from the shell 5 and this space is tightly packed with heat insulating material 18, such as mineral wool. The pot 15 is maintained in its spaced relation by the use of an upper annular spacing wall 19 which rests upon the upper edge of the casing wall 6 on the shell. This annular spacing wall 19 carries a depending flange 20 which is snugly fitted on the upper end of the casing wall 6 and the lower end of the flange 20 seats and abuts against the bead 7.

A lower spacing bracket 21 is carried by the lower wall 17 of the pot 15 and this spacing bracket, as shown, is of a substantially V-shape and abuts at its lower end against the bottom wall 8 of the shell. The upper ends of the legs of the bracket can be provided with attaching feet 22 which are spot welded or otherwise secured to the lower face of the bottom wall 17 of the pot. A fastening screw 23 is extended through the opening 12 in the bottom wall 8 and is threaded into the bracket 21. This serves as means for drawing the pot 15 toward the bottom wall 8 and thus brings the flange 20 into intimate contact with the bead 7 and the lower edge of the casing wall 6 into intimate contact with the offset portion of the flange 9 of the bottom wall. The screw also serves as means for uniting the mentioned parts together.

An insulating sheet of material 24 is placed in engagement with the outer face of the cooking pot 15 and wound about the insulating sheet 24 is the heating element 25 which can be of any preferred character and formed from any desired type of resistance wire.

By referring to Figure 3 of the drawings, it can be seen that it is preferred to have the heating element 25 consisting of a high and low heating coil 26 and 27. The inner terminals of the high and low heating coils 26 and 27 can be connected together by a bridge wire 28, and this bridge wire has connected thereto a conductor wire 29 which leads to a central terminal prong 30. The outer terminals of the high and low heating coils are connected to the side terminal prongs 31 and 32.

These prongs 30, 31 and 32 are arranged within and suitably secured to a cup or socket receptacle 33. This receptacle extends into the shell, so that the outer face of the shell will be substantially smooth, and it is obvious that a plug (not shown) leading from any suitable source of electrical energy can be either connected with the prongs 30 and 31, when a high temperature is required, or with the prongs 30 and 32 when a low temperature is required. The outer ends of the cup 33 can either be flanged over the casing wall 6, as shown at 34, or the cup can be spot welded to the inner face of said casing wall 6.

It is preferred to provide an annular depression in the upper face of the spacing wall 19 of the cooking pot 15, so as to form a well 35. The depending skirt 36 of the removable cover 37 for the cooking vessel can be received within the well and if desired, the well can be filled with a liquid so as to form a water seal. The cover 37 can also be formed of enameled metal ware if so desired and is provided with any desired type of manipulating knob 38.

Figure 5:
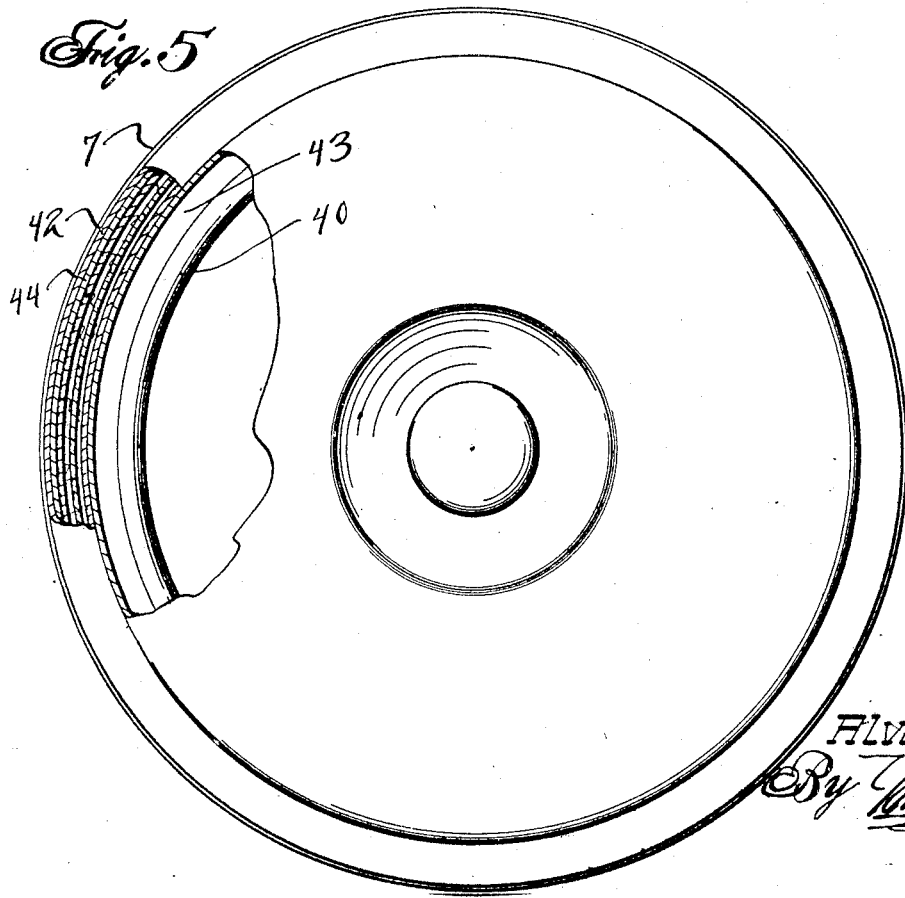
Figure 5 is a top plan view of that form of the cooker shown in Figure 4 of the drawings.

In Figures 4 and 5 I have shown a slightly modified form of my invention and in this form I illustrate the use of a removable cooking utensil 40. This cooking utensil is removable, so that the same can be readily taken from the cooker for the purpose of cleaning. In accordance with my invention, the upper edge of the removable cooking receptacle 40 is provided with an outstanding annular flange 41 which overlies the top wall of the casing. Formed on the outstanding flange 41 is a depending supporting skirt or flange 42 which rests on the bead 7 formed on the shell.

The outstanding flange 41 can be provided with an annular depression to form the well 43 and this well is adapted to receive the flange on the cover.

In order to permit the association of the removable receptacle 40 with the heater and cooker, the inner vessel has its upper edge provided with an arcuate depression or seat 44 in which is fitted the depending well 43.

In all other respects, the construction of this form is identical with the construction shown in Figures 1 and 2.

From the foregoing description, it can be seen that I have provided an exceptionally simple form of electric heat insulated cooking vessel, in which all of the parts thereof can be readily assembled and taken apart for repairs and the like.

Changes in details may be made without departing from the spirit or the scope of this invention, but what I claim as new is:

An electric heat insulated cooking vessel comprising an outer shell having a side casing wall provided with a struck-out bead adjacent to its upper end, and a removable bottom wall having a depending offset flange defining a shoulder and a vertical abutment wall, a cooking receptacle received within the shell including a side wall arranged in spaced parallel relation to the side casing wall, and a bottom wall disposed in spaced parallel relation to the first mentioned bottom wall, the side wall of the cooking receptacle having an outstanding upper spacing wall provided with a depending flange receiving the upper edge of the side casing wall and engaging said struck-out bead, the lower edge of the side casing wall receiving the first mentioned bottom wall and engaging the vertical abutment wall and shoulder thereof, heat insulated material packed between the side wall, bottom wall and spacing wall of the cooking receptacle and the side casing wall and bottom wall of the shell, a depending substantially V-shaped spacing bracket carried by the bottom wall of the cooking receptacle, a single fastening element extending through the bottom wall and into the bracket, and an electrical heating element arranged in close relation to the cooking receptacle.

In testimony that I claim the foregoing I have hereunto set my hand at Milwaukee, in the county of Milwaukee and State of Wisconsin.

ALVA T. SMITH.